United States Patent
Hollander et al.

(10) Patent No.: US 7,259,686 B2
(45) Date of Patent: Aug. 21, 2007

(54) TWO WIRE TEMPERATURE TRANSMITTER

(75) Inventors: Milton Bernard Hollander, Stamford, CT (US); Michael A. Macchiarelli, Shelton, CT (US); Shahin Baghai, Trumbull, CT (US)

(73) Assignee: White Box, Inc., Stamford, CT (US)

( * ) Notice: Subject to any disclaimer, the term of this patent is extended or adjusted under 35 U.S.C. 154(b) by 257 days.

(21) Appl. No.: 10/830,590

(22) Filed: Apr. 23, 2004

(65) Prior Publication Data

US 2004/0219822 A1 Nov. 4, 2004

Related U.S. Application Data

(60) Provisional application No. 60/466,586, filed on Apr. 30, 2003.

(51) Int. Cl.
*G08B 21/00* (2006.01)

(52) U.S. Cl. ............... 340/652; 340/584; 340/596; 340/538; 374/141; 374/171; 374/172

(58) Field of Classification Search ............ 340/652, 340/584–599; 374/141, 208, 172, 171, 181
See application file for complete search history.

(56) References Cited

U.S. PATENT DOCUMENTS

| | | | | |
|---|---|---|---|---|
| 4,166,243 A * | 8/1979 | West et al. | ............... | 324/537 |
| 5,189,396 A * | 2/1993 | Stobbe | ............... | 340/541 |
| 5,341,812 A * | 8/1994 | Allaire et al. | ............... | 600/508 |
| 6,074,089 A * | 6/2000 | Hollander et al. | ............... | 374/181 |
| 6,651,177 B1 * | 11/2003 | Rantze et al. | ............... | 713/300 |

\* cited by examiner

*Primary Examiner*—Benjamin C. Lee
*Assistant Examiner*—Travis R. Hunnings
(74) *Attorney, Agent, or Firm*—William A. Drucker

(57) ABSTRACT

A thermoelectric connector module (C) is disclosed which comprises input (2) and output (1E) connectors and contains signal conditioning circuitry (1C). The input connectors (2) are interfaced with a hand-held detector (7), and the output connectors (1E) are connected to signal-utilising apparatus (11). The module does not contain a battery but receives its power supply for the conditioning circuitry from the signal-utilising apparatus supplied via the output connectors (1E). In this way, the module may be miniaturised, making it particularly suitable for mounting directly on a hand-held temperature detector or probe. Since the connector does not have to be opened for a battery replacement, it can be permanently hermetically sealed, providing resistance to dirt, dust, moisture, water and the like.

1 Claim, 3 Drawing Sheets

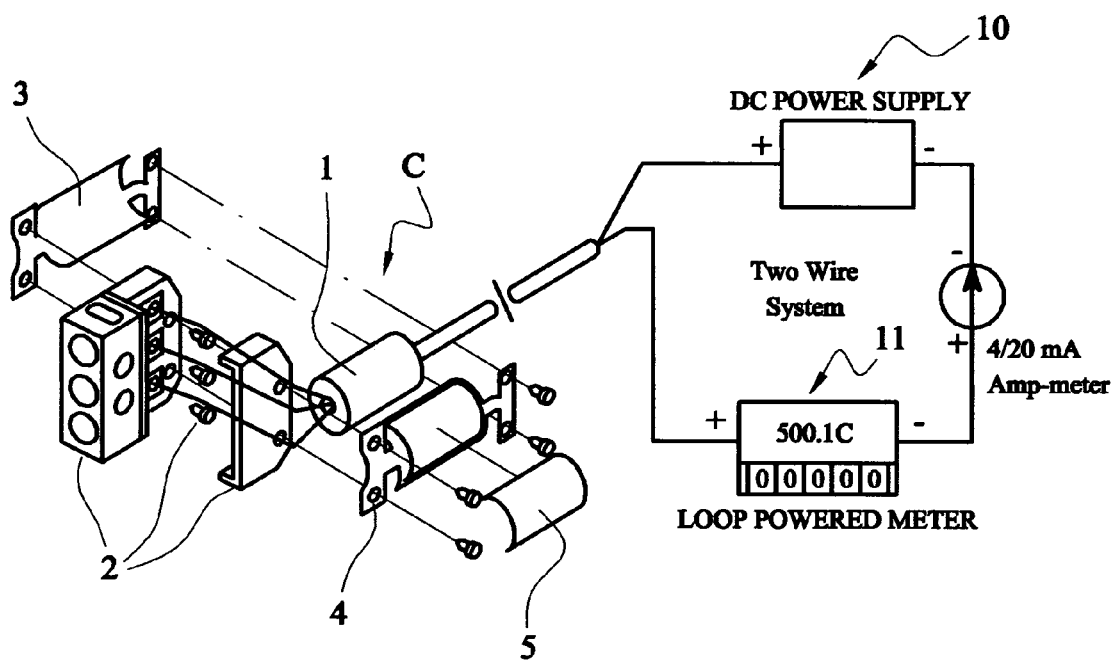
FIG. 1
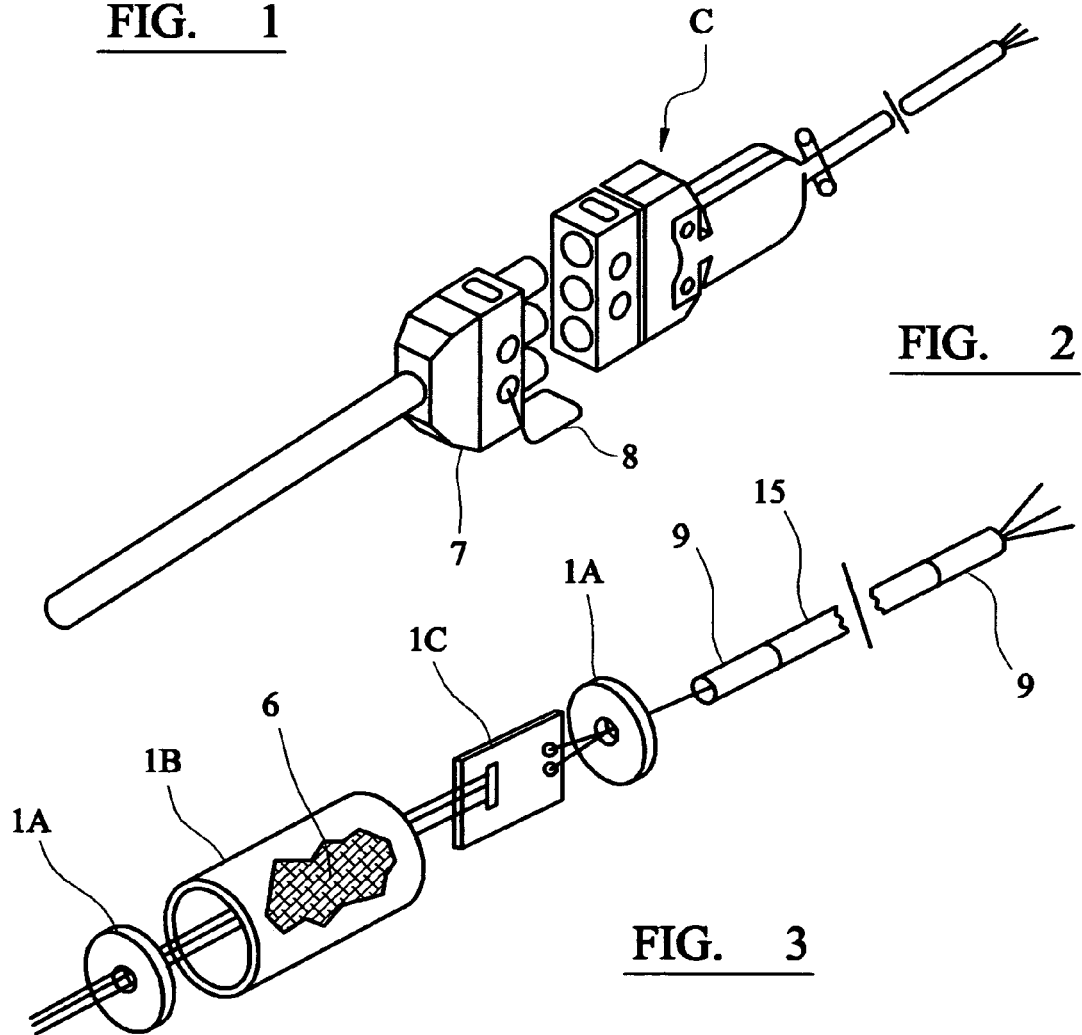
FIG. 2
FIG. 3

TWO WIRE TEMPERATURE TRANSMITTER

CROSS REFERENCE TO RELATED APPLICATIONS

This application claims priority from U.S. Provisional Patent Application Ser. No. 60/466,586, filed Apr. 30, 2003; the disclosure of which is incorporated herein by reference.

FIELD OF THE INVENTION

The present invention relates to thermoelectric circuit modules which are connectable between temperature detectors and apparatus or instrumentation which utilises the temperature measurement signals output from the detectors.

BACKGROUND OF THE INVENTION

The output voltage-versus-temperature characteristics of many temperature detectors, such as thermocouples or thermistors, are non-linear and unique, and their calibration curves are likewise non-linear and unique.

Linearisation circuitry is necessary to convert the non-linear curves to linear curves so that, for example, one millivolt of output voltage will be equivalent to 1° Centigrade or 1° Fahrenheit of measured temperature.

In addition, the linear or linearised curves may possess zero offsets, so that corrective circuitry is required.

Furthermore, some temperature detectors, such as thermocouples, may require a constant temperature reference, and this may be provided, for example, by cold junction compensation circuitry.

U.S. Pat. No. 6,074,089 (Omega Engineering, Inc.), incorporated herein by reference, discloses a hand-held connector module which contains the foregoing signal conditioning circuitry and a battery which powers the circuitry. The module is provided with input and output connectors which are respectively connected, via appropriate external leads, to a temperature detector and the test meter or other apparatus which utilises the temperature measurement signals.

OBJECTS OF THE INVENTION

A main object of the present invention is to provide an improved thermoelectric connector module incorporating signal conditioning circuitry.

Another object is to provide such a connector module which is relatively small and compact and can be hermetically sealed.

SUMMARY OF THE INVENTION

According to one aspect of the present invention, there is provided a connector module for connecting a thermoelectric temperature detector such as a thermocouple, or thermistor, to apparatus for utilising the temperature measurement signals output from the detector, the module being adapted to be releasably interfaced with a hand-held temperature detector to form a unitary detector and module, the module incorporating circuitry to condition or otherwise modify the output signals from the detector and output them to the signal-utilising apparatus.

According to another aspect of the present invention, there is provided a connector module for connecting a thermoelectric temperature detector such as a thermocouple, or thermistor, to apparatus for utilising the temperature measurement signals output from the detector, the module incorporating circuitry to condition or otherwise modify the output signals from the detector and output them to the signal-utilising apparatus via wiring which also serves to supply power to the conditioning circuitry.

The invention also provides a thermoelectric temperature detector and/or apparatus for utilising the temperature measurement signals output from the detector, in combination with a connector module as just defined.

The connector module embodying the invention includes a hermetically sealed transmitter module incorporating the signal conditioning circuitry. The transmitter module is fixed to or housed in a two or three terminal connector, e.g. socket, adapted to receive various standard two or three wire thermoelectric temperature probes. The selected probe is plugged directly into the connector if compatible with the connector, or alternatively indirectly via an adapter. The connector module and plugged in assembly form an integral unit which can be readily manipulated by hand. The conditioning circuitry contained in the transmitter module includes, for example, an amplifier, a linearisation circuit, a zero offset compensating circuit, and a cold junction compensation circuit, and/or any other appropriate circuitry necessary to interface a range of probes with a standard test meter, recorder or other signal-utilising apparatus.

The signal conditioning circuitry of the connector module is designed to transmit its output (e.g. current output) to the signal-utilising apparatus via two wires, and to receive its input power via the same two wire loops, from an external D.C. source. No internal battery is required. The two wires are incorporated in a flexible output lead terminating in a standard connector or connectors for connection to the signal-utilising apparatus and/or D.C. source.

Immunity against external electromagnetic interference and elimination of any possible radiated and/or conducted emissions from the transmitter module to the external environment is achieved by providing filtering at the input and/or output terminals of the transmitter module, by using a multi-layer printed circuit board for the conditioning circuitry, and by providing effective shielding, including shielding or screening of the output lead of the connector module.

The transmitter module has built-in open input detection circuitry, whereby if the input of a two or three wire thermoelectric detector opens on any wire or combination of wires, the circuitry detects the open input and will drive the transmitter module output either upscale or downscale to indicate or give a warning of the open input condition to the user of the signal-utilising apparatus.

The connector module embodying the invention does not require any internal power supply, i.e. battery. This enables the module to be miniaturised, making it particularly suitable for mounting directly on a hand-held temperature detector or probe. Since the connector does not have to be opened for battery replacement, it can be permanently hermetically sealed, providing resistance to dirt, dust, moisture, water, etc.

The connector module uses a common two-wire loop to output the detector signal to the signal-utilising apparatus and to supply power from an external source (which may be discrete, or part of the signal-utilising apparatus) to the conditioning circuitry. This, in addition to the fact that the standard probes plug directly into the module, make the external wiring and connections compact and uncomplicated.

BRIEF DESCRIPTION OF THE DRAWINGS

Reference will now be made to the accompanying drawings, in which:

FIG. 1 is an exploded perspective view of a connector module embodying the invention;

FIG. 2 is a perspective view of the assembled connector module of FIG. 1 and an associated thermoelectric temperature sensing probe;

FIG. 3 is an exploded perspective view of the transmitter module of FIG. 1;

DETAILED DESCRIPTION OF THE PREFERRED EMBODIMENT

Figure 4:
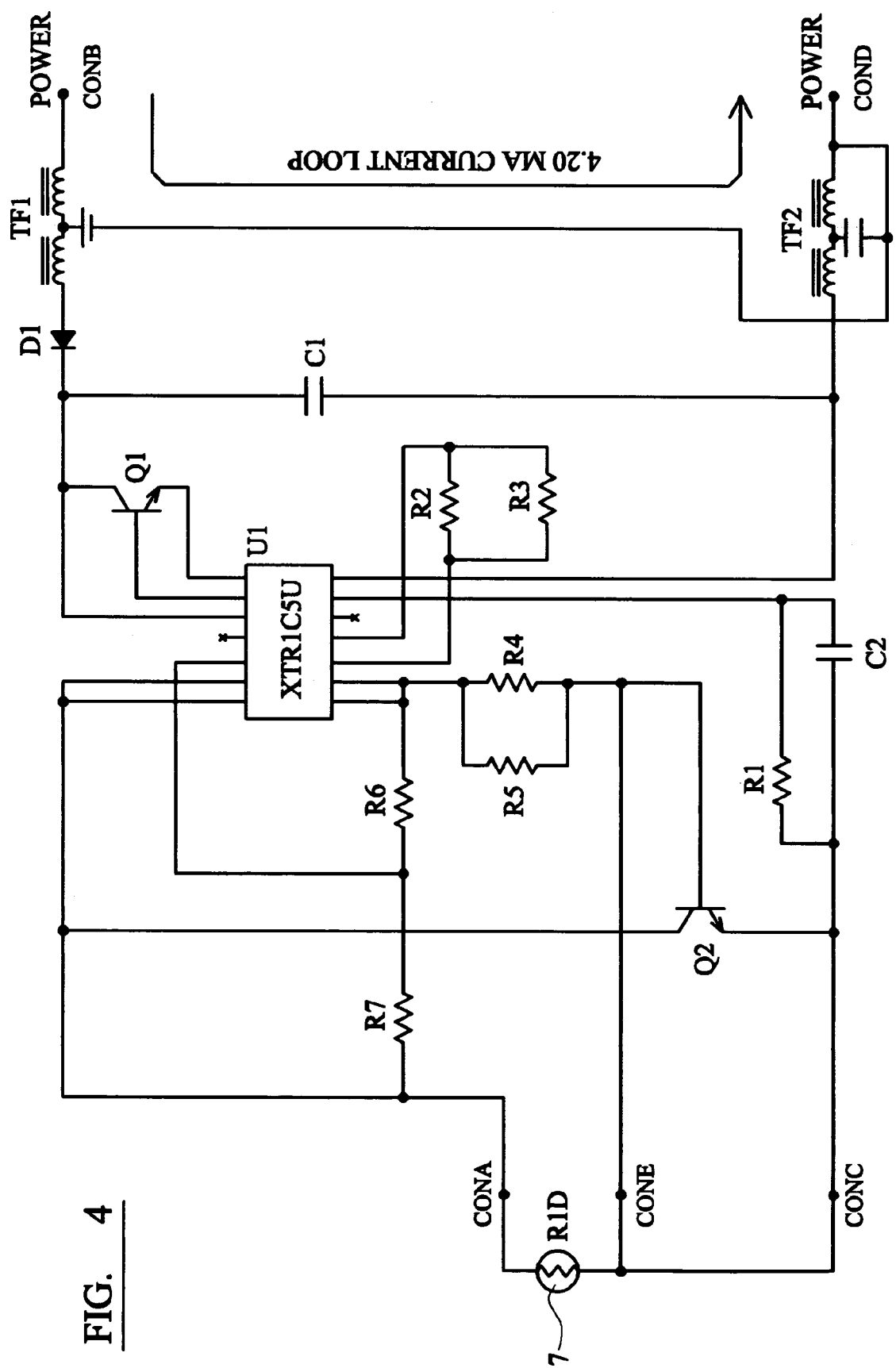
FIG. 4 is a schematic circuit diagram of one embodiment of the signal conditioning circuitry of the transmitter module.
Figure 5:
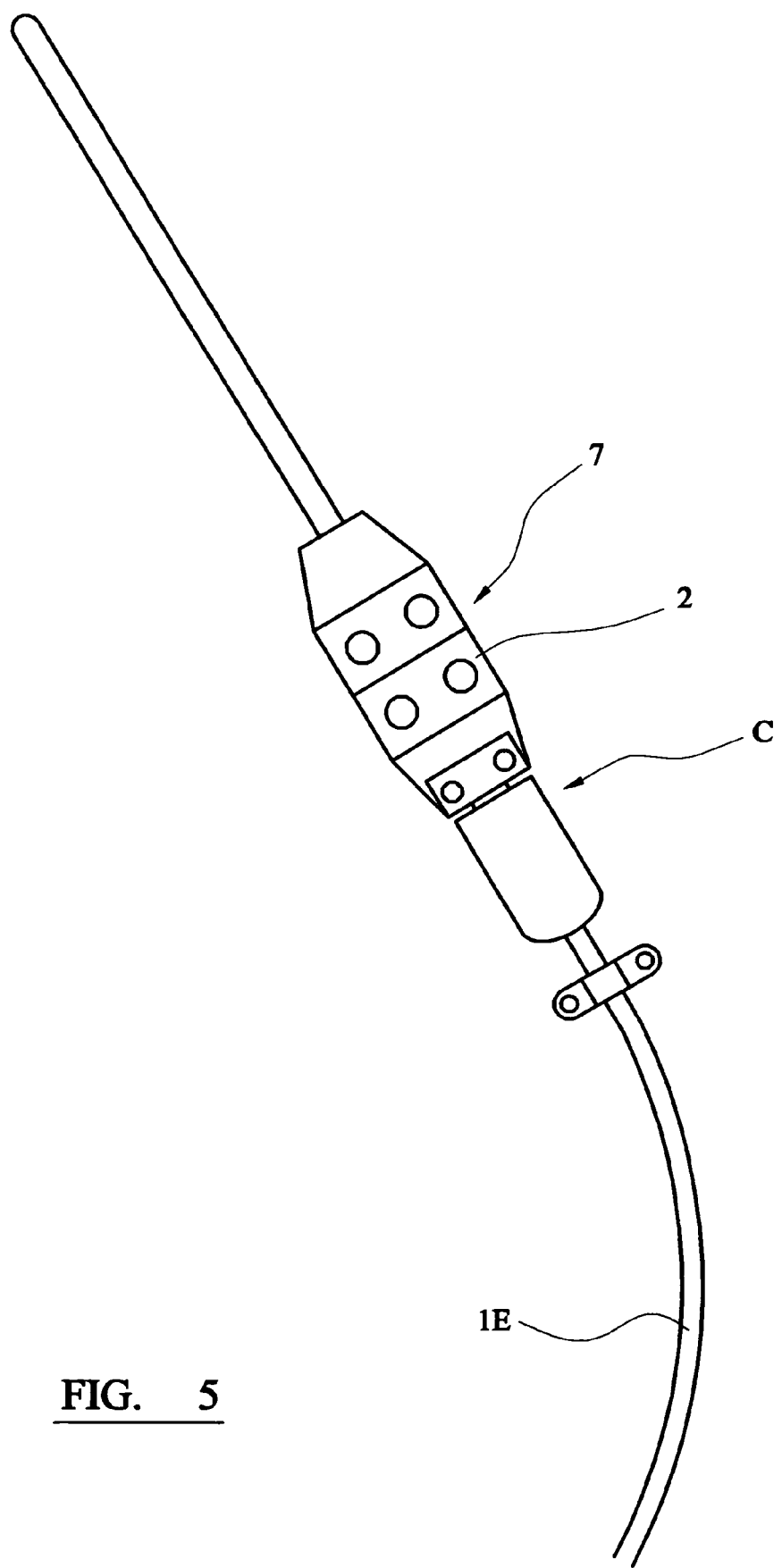
FIG. 5 is a plan view of an assembled connector module and probe.

Referring to the drawings, the connector module C comprises a transmitter unit or module 1 incorporating signal conditioning circuitry, and a connector assembly 2 having a 3-pin socket configured to receive the plugs of a range of standard two or three wire thermoelectric temperature detectors or probes 7. Such detectors may be resistance temperature detectors (RTD), thermistors, thermocouples (TC) or solid state sensors. The pins of the socket of the connector assembly 2 are wired within the connector module to the input to the signal conditioning or processing circuitry (see FIG. 4), which is mounted on a multilayer PCB 1C located in the transmitter module 1. The transmitter module is firmly clamped to and housed in the connector socket or base by brackets 3, 4 and screws. Element 5 is a product label.

The transmitter module has a flexible output lead 1E having a connector, e.g. a plug or socket (not shown) at its free end for connection to external signal-utilising apparatus. The apparatus may be a standard device, such as an indicating device, test meter, panel meter or display, a controller, PLC computer, data logger or chart recorder. The output lead 1E comprises two wires connected to the analog output of the signal conditioning circuitry, and a third wire attached to the connector module housing which forms a shield or screen against electromagnetic or other radiation to or from the module which might cause interference.

As shown in FIG. 3, the transmitter module 1 basically comprises a multilayer printed circuit 1C carrying the circuitry shown in FIG. 4, including a microprocessor U1, for example identified as an XTR 105U processor manufactured and marketed in USA by Texas Instruments Inc. The circuit board also carries resistors R1 to R6, transistors Q1 and Q2, and diode D1, connected in the circuit configuration shown in FIG. 4, to form an input amplifier, a linearisation circuit which provides a linear output with respect to the measured temperature, compensation circuitry to provide for zero and span or range adjustments where the analog output is adjusted both at the bottom and top of the range. The circuitry also has a built-in open input detection circuit which detects, and provides an indication or warning, if any line or lines from the temperature probe are open circuit. The circuitry may include a cold junction compensation circuit. Other circuitry may be provided if necessary to enable the connector module to interface between various thermoelectric detectors and various signal utilising apparatus.

Reference should be made to our aforesaid U.S. Pat. No. 6,074,089 for a more detald description of the foregoing circuitry.

The printed circuit board 1C and its components are assembled within a tubular housing 1B closed at its opposite ends by washers 1A, e.g. of rubber, through which the input and output wires from the circuit board pass, and the assembly is hermetically sealed, for example encapsulated in an epoxy resin, to form the transmitter module 1. Element 15 is an insulated output wire; element 9 is an output wire with outer insulation stripped away.

As shown schematically in FIG. 1, the signal conditioning circuitry is powered by an external 9 to 36 volts DC power supply 10, so that no internal battery is required. The power is supplied via the same two wires of the output lead 1E that are used to provide the conditioned output signals to the signal-utilising apparatus, e.g. the meter 11. The current drawn by the circuitry from the supply 10 is the circuit output and corresponds to the measured temperature. The transmitter module is therefore a 2-wire transmitter where the current output and power input are in the same 2-wire loop.

The transmitter/connector module can be produced in single model versions, or multiple model versions, in which the overall temperature range of the thermoelectric detector is accommodated in one unit for ease of use, or divided into multiple ranges for improved accuracy and resolution.

A signal conditioner could, for example, convert the resistive change of 100 ohm, 0.00385 RTD temperature sensor or probe across a dedicated temperature range into an industry standard 2-wire, 4 to 20 mA analog output. The same, or another form of signal conditioner, could, for example, convert the non-linear millivolt output of a thermocouple sensor or probe across a dedicated temperature range, into the same standard 2-wire, 4 to 20 mA analog output. The analog output can be sent several hundreds of feet from the location of the sensor/probe to the indicating device or other signal-utilising apparatus without degradation of the output signal.

The module circuitry, as shown in FIG. 4, also includes L/C filters including transformers TF1, TF2, diode D1 and capacitor D1 to reduce or eliminate interference as well as providing reverse power polarity protection.

It will be understood that various modifications may be made without departing from the scope of the present invention. For example, the same principles may be applied to connector modules for interfacing between signal-utilising apparatus and probes or sensors used for measuring or detecting parameters other than temperature, e.g. voltage, current, flow rates, pressure, frequency, conducting, pH, humidity etc.

The invention claimed is:

1. In a modular two wire temperature transmitter comprising a variable external DC power supply in which the transmitter acts as a variable load to said external power supply, and current from said power supply is proportional to process temperature measurement, external and input connectors (2) and output wires (E), incorporating signal conditioning circuitry (1C), input connectors (2), interfaced with a hand held detector (7), and having said output wires (1E) connected to signal utilizing apparatus (11), and in which said hand held detector (7) is detachable from a hermetically sealed module (C) which is interchangeable with corresponding input connectors which include means to receive a thermoelectric temperature probe;

the improvement in which both a transmitted temperature signal and power from the power supply are each transmitted to the module in the same two wire circuit, whereby said module is powered externally through said output wires to a signal cicuit comprising the combination of an amplifier, linearization means, zero offset compensation means and cold junction compensation; and in which the DC power supply does not control the power delivered to the transmitter, but whereby the current draw from said power supply by the two wire transmitter, is an analog output from the transmitter which is monitored and measured to indicate temperature.

* * * * *